(12) United States Patent
Lund et al.

(10) Patent No.: US 6,474,015 B1
(45) Date of Patent: Nov. 5, 2002

(54) OUTDOOR REFILLABLE BAIT STATION

(75) Inventors: James L. Lund, Lake Elmo, MN (US); Gordon Morrison, Flower Mound, TX (US); Lisa Olson, Pleasanton, CA (US)

(73) Assignee: Aventis Environmental Science, S.A., Lyons (FR)

(*) Notice: Subject to any disclaimer, the term of this patent is extended or adjusted under 35 U.S.C. 154(b) by 0 days.

(21) Appl. No.: 09/626,702

(22) Filed: Jul. 27, 2000

Related U.S. Application Data

(60) Provisional application No. 60/146,482, filed on Jul. 30, 1999.

(51) Int. Cl.[7] .................................................. A01M 1/20
(52) U.S. Cl. ........................................ 43/124; 43/131
(58) Field of Search .................... 43/131, 47.5, 124, 43/132.1; 52/165

(56) References Cited

U.S. PATENT DOCUMENTS

| | | | |
|---|---|---|---|
| 5,329,726 A | 7/1994 | Thorne et al. | 43/124 |
| 5,457,918 A | * 10/1995 | Plourde | 52/165 |
| 5,555,672 A | 9/1996 | Thorne et al | 43/124 |
| 5,746,021 A | 5/1998 | Green | 43/131 |
| 5,870,853 A | 2/1999 | Williams | 43/131 |
| 5,901,496 A | 5/1999 | Woodruff | 43/124 |
| 5,918,410 A | 7/1999 | Knuppel | 43/131 |
| 6,164,010 A | * 12/2000 | Snell et al. | 43/131 |

* cited by examiner

*Primary Examiner*—Peter M. Poon
*Assistant Examiner*—Floris Copier
(74) *Attorney, Agent, or Firm*—Connolly Bove Lodge & Hutz LLP

(57) ABSTRACT

A device for baiting insects which includes an anchor tube that is placed in the ground, a base plate that attaches to the anchor tube, a cover that attaches to the base plate, a bait cup placed in said anchor tube and that sits beneath the ground, and a termite media support rod that attaches to the bait cup and sits in the anchor tube, beneath the ground, the key to open the cover and access the bait, the anchor tube being molded into one integrated piece with a continuous spiral fin or threaded member that acts as a screw mechanism when inserting the station into the ground and the base plate, which sits at ground level, includes insect entry openings; a cover covers the base plate and bait cup, protecting the bait from the elements; and optionally a termite media support rod, which includes a disk molded on the bottom thereof used to hold material for termite monitoring.

5 Claims, 4 Drawing Sheets

OUTDOOR REFILLABLE BAIT STATION

CROSS-REFERENCE TO RELATED APPLICATION

The present application claims the benefit of the filing date of United States Provisional Application No. 60/146,482, filed on Jul. 30, 1999 and entitled "Outdoor Refillable Bait Station".

BACKGROUND OF THE INVENTION

The present invention is a device for baiting, controlling and monitoring insects and other pests. More specifically, the invention relates to a semi-permanent, lockable device for crawling insects as well as termites and other pests. The device anchors securely in the ground, and is tamper resistant helping to prevent children and pets from pulling out the device and accessing the bait. The device also protects the bait from the elements, prevents spillage of bait if kicked, and is extremely sturdy if walked on and low profile to avoid being damaged by a lawn mower.

Outdoor refillable stations fit with the Integrated Pest Management (IPM) philosophy that the Pest Control Operator (PCO) industry is moving towards. They enable PCOs to reduce the amount of pesticides applied indoors by using more effective, longer lasting perimeter treatments, they reduce the amount of pesticide applied over time and they provide a means of monitoring to let the PCO know how much, if any, insecticide needs to be applied in a given location. In addition, outdoor refillable stations allow the PCO a more economical way to deliver bait products. This in turn produces less waste.

In addition to baiting crawling insects, another recent trend has been the use of outdoor, refillable stations for termite monitoring (U.S. Pat. No. 5,901,496). These devices are placed underground and are filled with a non-toxic, termite attracting material. By monitoring these devices, PCOs are able to tell whether termites are adjacent to or infesting a structure, and if so, can execute a treatment plan.

Various devices have been introduced to combat crawling insects and monitor termites. Devices referred to in U.S. Pat. Nos. 5,329,726; 5,555,672; 5,746,021; 5,870,853; 5,873,193; 5,901,496; and 5,918,410, as well as the B&G Perimeter Patrol Station, all incorporate a stake or tube which is attached to the bait station and is inserted into the ground.

Unlike the current invention, however, these stakes or tubes have no means of securely holding the devices into the ground. Therefore, the stations can be easily removed by children, who then may be able to access the contents of the bait stations. They can also be tampered with, or dug up by animals. Therefore, there is a need for an outdoor, refillable station that can be securely anchored into the ground.

A primary objective of the present invention is that the bait station is securely anchored to the ground, and therefore should be difficult to remove by adults, children, or animals.

Another objective of the present invention is that since the bait cup is placed below ground level, the risk of bait spillage is minimized if the station is kicked or otherwise disturbed.

Another objective of the present invention is that the bait station is low profile, extremely strong, sturdy, and durable, allowing a long station life, and protection if the station is stepped on or is run over by a lawn mower.

Another objective of the present invention is a bait station, which includes a child resistant lock mechanism that requires a key in order to open the cover and access the bait.

Another objective of the present invention is that both the base plate and bait cup lip are angled up, reducing the risk that ground surface water or drainage from the unit will enter into the bait cup. If surface water should enter the unit it will drain out of the unit before entering the bait container.

Another objective of the present invention is that if the ground beneath the anchor tube floods with water, the bait cup will float up and water will drain out through the base plate, thus preventing water from entering into the bait cup unless the station becomes completely submerged.

Another objective of the present invention is the ability to provide a bait cup that is pre-filled and closed with a snap-on, snap-off cover so pre-filled, interchangeable bait cups can be easily transported without bait spillage.

Another objective of the present invention is that the bait cup can hold several different pesticide bait forms and/or attractants designed to lure pests, such as granular, liquid, and gel.

Another objective of the present invention is that the station is easily monitored and serviced by the PCO, and that the bait cup can be refilled on-site or at the PCOs business.

Another objective of the present invention is that the station can either be filled/refilled with bulk baits by the PCO or that it can be filled/refilled using pre-filled bait cups.

Another objective of the present invention is the use of the anchor tube as an optional termite monitor/control device support rod, which holds material to monitor and/or kill termites.

SUMMARY OF THE INVENTION

The present invention is a device for baiting insects and other pests. The baiting device includes an anchor tube that is placed in the ground, which can hold material to monitor and/or control termites, a base plate that attaches to the anchor tube, a cover that attaches to the base plate, a bait cup that holds bait beneath the ground, and optionally, a termite media support rod with a disk that attaches to the cup and sits in the anchor tube, beneath the ground. The anchor tube is preferably molded into one integrated piece with a continuous external spiral fin or threaded member that acts as a screw mechanism when inserting the station into the ground. The base plate, which sits at ground level and snaps on after the anchor tube is in place (allowing the base plate to be installed directly adjacent to a structure) includes pest entry holes, and a textured surface for pests to crawl on before reaching the bait cup. The cup can be used with multiple bait products. The cover covers the base plate and cup, protecting the bait from the elements. The optional termite rod, which includes a disk molded on the bottom thereof, is used to hold material that is used for termite monitoring and/or exterminating.

These and other objects and advantages of the present invention will become apparent to readers from a consideration of the ensuing description and the accompanying drawings.

DESCRIPTION OF THE PREFERRED EMBODIMENT

Figure 1:
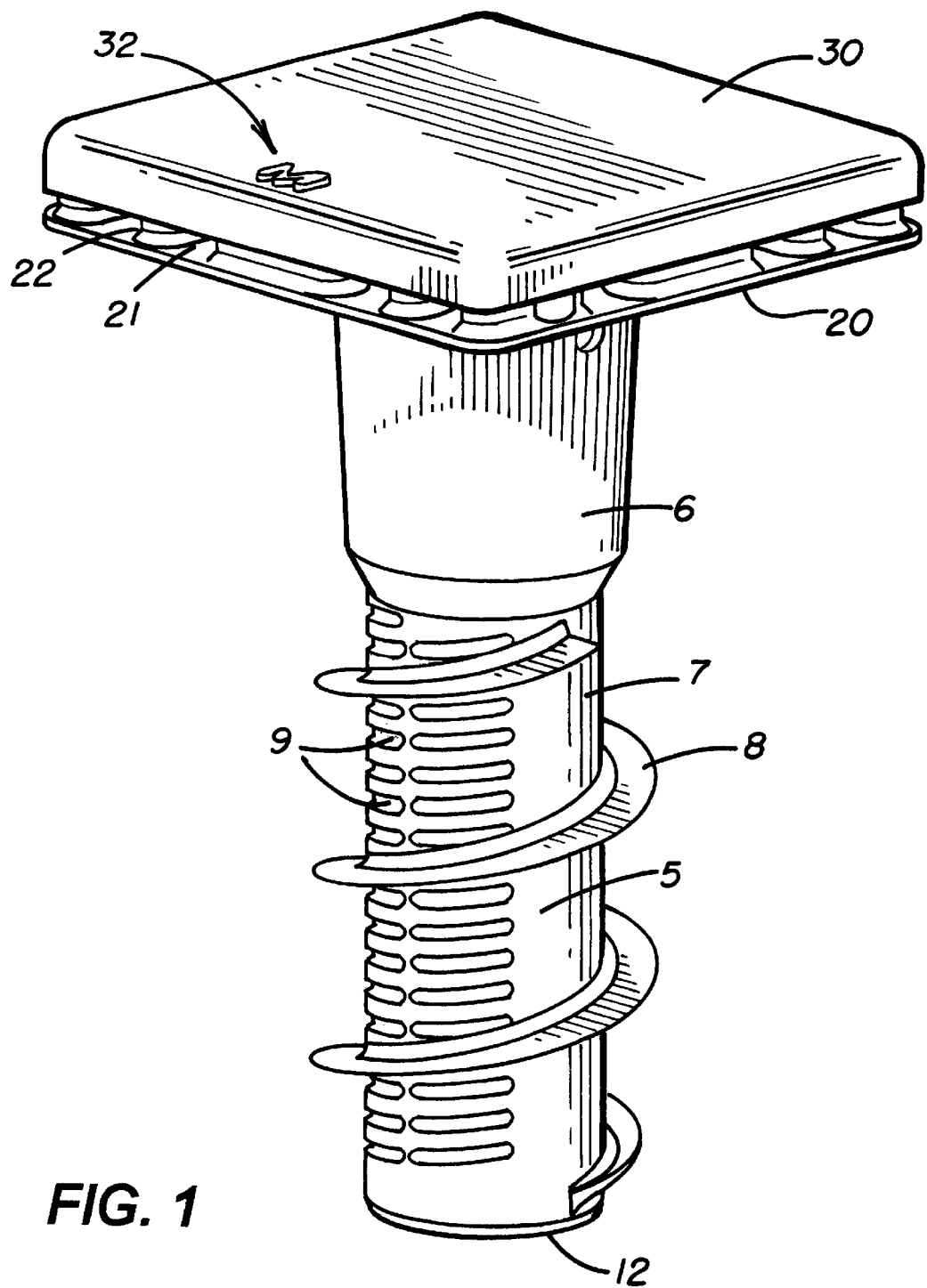
FIG. 1 is an overall perspective of the fully assembled bait station of this invention.
Figure 2:
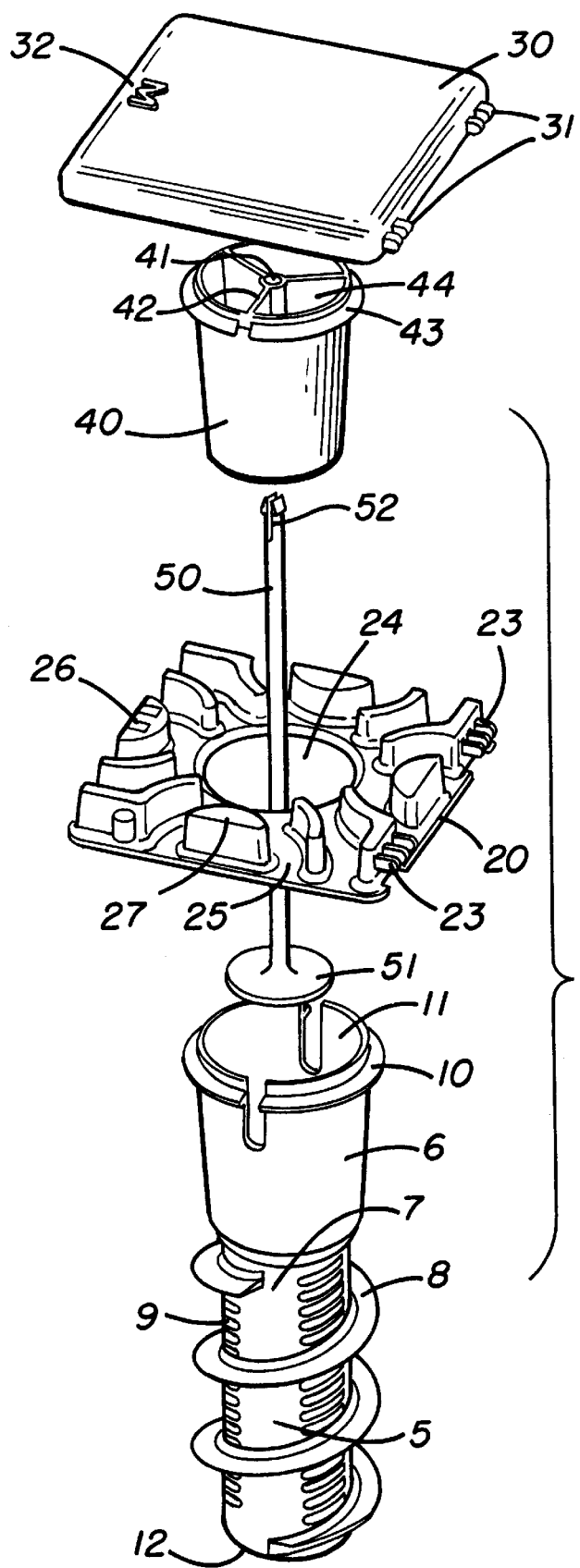
FIG. 2 is an exploded view of the components of the bait station of this invention.

With reference to the drawings, the preferred embodiment of this invention is shown in FIGS. 1–4.

The present invention includes the following major components: an anchor tube 5, a base plate 20,) a cover 30, a bait cup 40, an optional termite media support rod 50, and a key 60. All components are formed out of a strong, durable plastic material, and are molded to be assembled into a single integrated unit. Other materials can be substituted as needed. All components are molded or formed to be assembled into a single, integrated unit. If termite monitoring/control is not required, the device can be assembled without the addition of a termite monitoring or control agent termite media support rod. A weather resistant label for recording contents, warnings, service dates, etc., that can be written upon, can also be provided.

The hollow anchor tube 5 is molded with two open ends, the upper end 11, and the lower end 12. The top portion 6 of the anchor tube 5 forms the housing for the bait cup 40. The bottom portion of the anchor tube 7 includes a continuous spiral fin 8, which could be non-continuous, as well as four sets of angled slits 9 that form entry holes for termites into the lower termite monitoring and baiting area.

Figure 3:
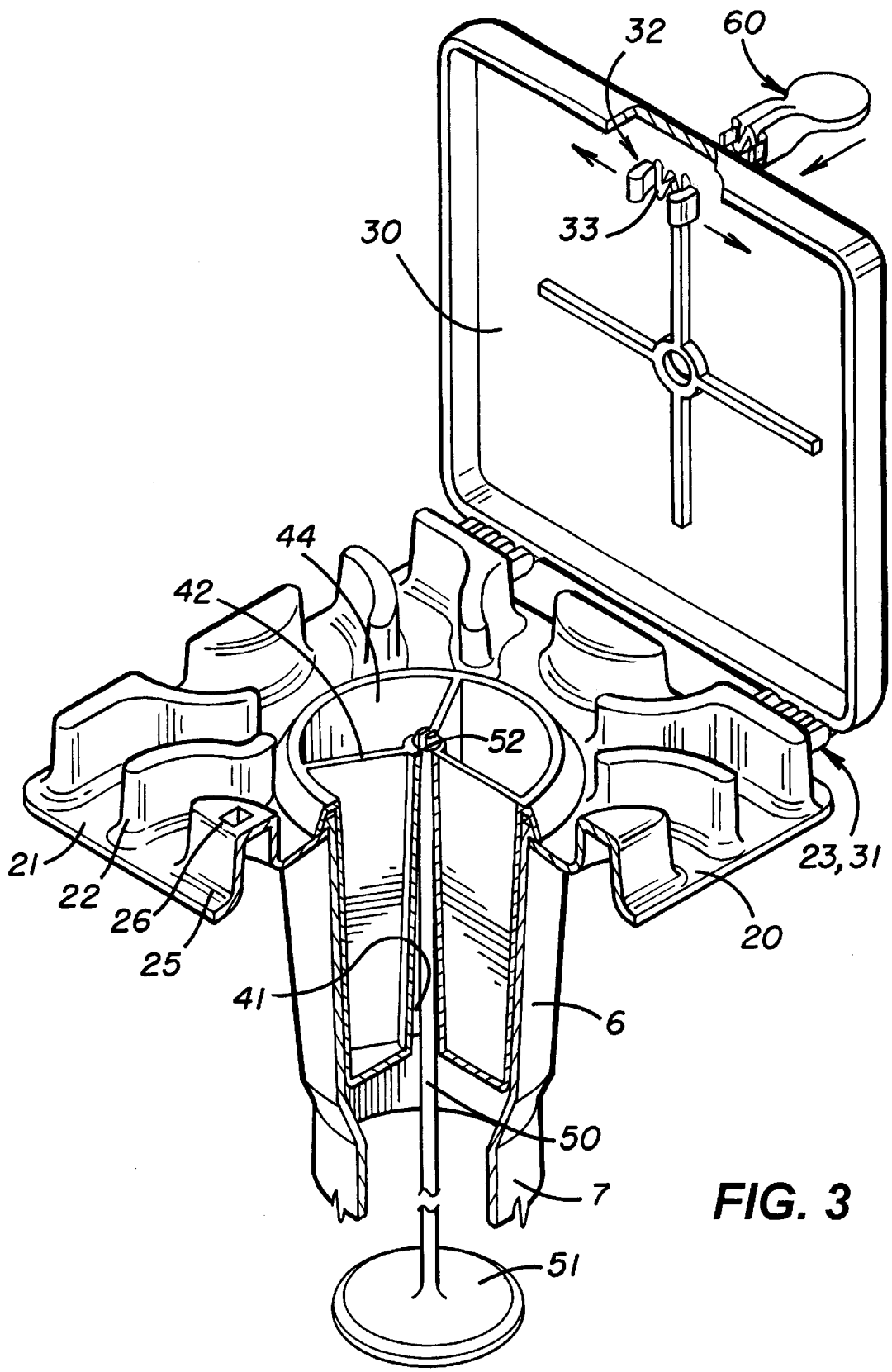
FIG. 3 is a fragmented cutaway view of the cover and base plate with the bait cup and optional termite media support rod in place.
Figure 4:
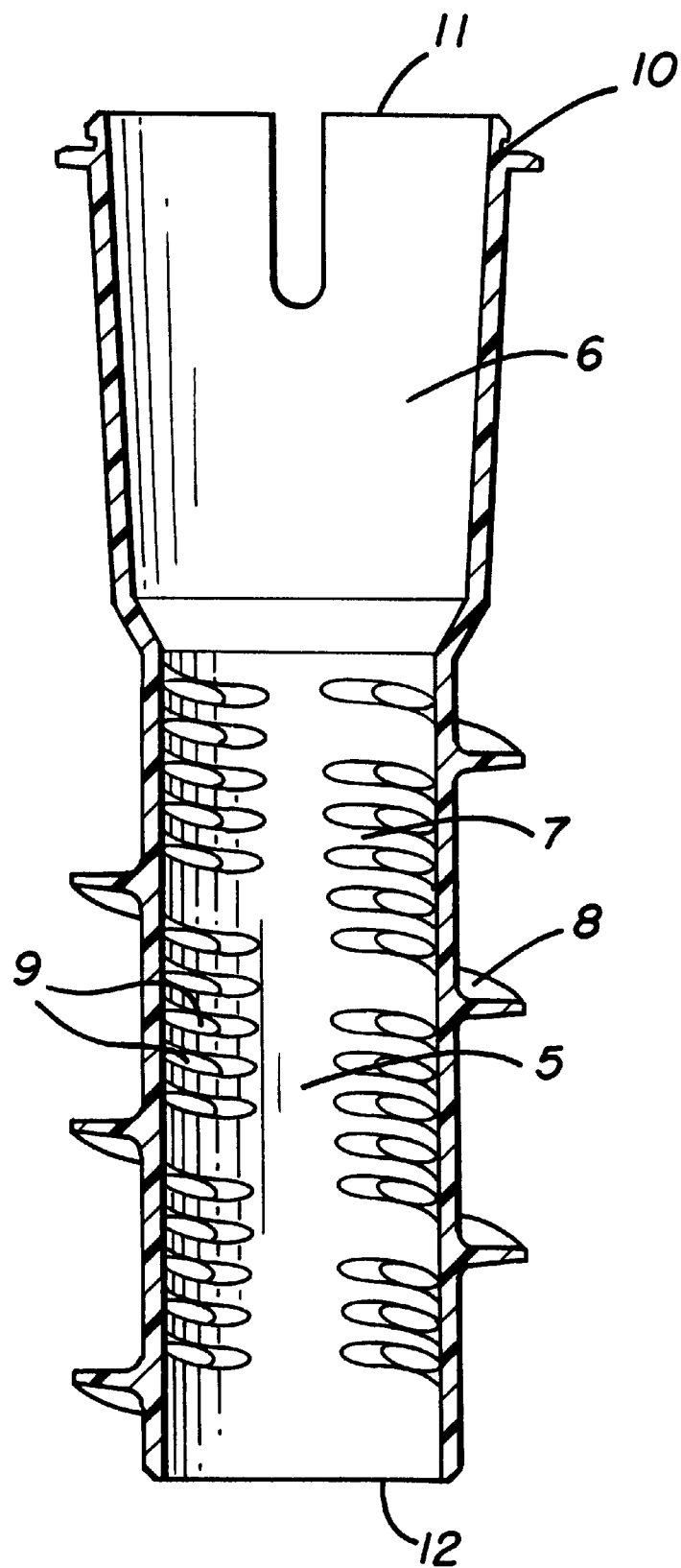
FIG. 4 is a full sectional view of the anchor tube of the bait station of this invention.

The base plate 20 attaches to the upper open end 11 of the anchor tube 5 using a snap-fit feature 10 and the base plate can freely rotate thereon to prevent removal (by unscrewing) of the anchor tube and whole bait station. Other known attachment methods can be utilized without detracting from the invention. The base plate 20 includes pest entry holes 21 with guide walls 22 and 27 leading from the periphery of the station to the central bait cup 40. The guide walls 22 exit in a vertical or near vertical orientation from the base 20 and also provide the base 20 and cover 30 assembly with ample strength should the station be stepped on or run over by a lawn mower. This optimal stiffness to weight ratio is obtained by maximizing the second moment of area in all directions (moment of inertia) of the base plate 20 while at the same time keeping the amount of material used within acceptable limits. The base plate 20 is flat along the outside edge 25, but can angle up towards the central hole 24 that houses the bait cup 40. Such angling would provide some barrier to flooding rainwater entering the bait cup 40 as shown in FIG. 3 and adds stiffness strength. The hinge mechanisms 23 and 31 on the base plate and cover semi-permanently attach the two components together. Other known lid attachment methods can be utilized without detracting from the invention.

A lock mechanism is comprised of a receiving member 26 in the base plate 20 and a key receiving member 32 in the cover 30 so that only those who have the matching key 60 can open the cover 30 by inserting key 60 through key aperture 33 and access the bait. This lock mechanism 26 and 32 reduces the chance that children will open the station, thereby making the station child resistant when placed in the ground. Other known child resistant lid structures can be utilized without detracting from the invention.

The bait cup 40, which fits inside the base plate 20 and is housed in the top portion 6 of the anchor tube 5 and which preferably includes three thin walled partitions 42, which extend vertically from the bottom to the top of the cup 40. Each partition 42, for example, may extend from the inside of cup wall to the center of the cup and meet at the hollow cylindrical section in the center of the cup 41, thereby forming three equally sized sections. However, the configuration and number of sections may vary with use. These sections 44 are used to house different pesticides, attractants or materials that aid in killing or trapping pests. Cups with more or less sections than three can be utilized without detracting from the invention. The cup is molded with a flange 43 that rest along in the circumference of the center hole in the base plate 24 as well as the upper end 11 of the anchor tube.

The base plate, cup flange and cup can have a smooth surface, but it is preferred that they have a textured surface to provide insects better traction while traveling to and from the bait. The bait cups can be used alone without bait as an insect trap or certain insects when provided with a smooth or sticky surface.

The flange 43 on the cup provides insects with an uninterrupted surface from the base plate 20 to the inside of the bait cup 40. The center of the bait cup is a hollow cylindrical section 41 which can be used to attach the optional termite media support rod 50.

The optional termite media support rod 50 attaches through the hollow cylindrical section in the center of the cup 41 and extends down through the center of the anchor tube 5. A disk 51 is molded at the bottom end of the rod. The purpose of the disk 51 is to hold materials used for termite monitoring and/or exterminating. The top of the rod attaches to the bait cup. One attachment means is shown in FIG. 3 as releasable snap fit attachments separately by slot 52 called Knocks that hook at or near the top of the hollow tube 41 in the center of the cup 40 and attached to the hollow tube 41 to enable the inspection of the monitoring material by lifting up on the cup 40. The optional termite rod 50 extends from just beneath the top of the cup to the lower open end of the anchor tube 12. In place of a media support rod a pest food source such as cellulose, Styrofoam, or the like can be placed in the hollow anchor tube 5 below the cup 40.

The bait cup can also be provided with a snap on lid that allows bait to be transported in a replaceable/interchangeable cup. Other known bait cup lids can be used to protect bait while in the station without detracting from the invention.

The invention can be utilized with multiple types of bait. Different baits may be attractive to different pests or even to the same pests at different times of the year. For instance, granular, liquid, and gel baits can each be placed in one of the sections of the bait cup 44. Each of the cup sections 44 can also hold one of the baits mentioned, or combinations of baits. Another possibility is that bait can be placed on the top of the bait cup partitions 42 or on the base plate 20. The above-mentioned embodiments are given only as examples; no limitations with respect to bait configurations is intended or implied.

Method of Operation:

1) In operation, the user places the station in probable areas of pest activity, or around the perimeter of a structure.

2) An auger is used to dig a hole in the ground, which is the size of the outside diameter of the anchor tube cylinder.

3) The anchor tube is then screwed into the hole by hand, with a manual tool, or with a power tool (i.e. engine based or electric motor based). Because the diameter of the spiral fins is greater that the diameter of the hole, the fins displace some soil so that the anchor tube securely affixes to the ground.

4) When the top of the anchor tube is just above ground level, the operator then attaches the base and cover (which have been previously assembled).

5) The operator optionally places the termite monitoring material in the anchor tube.

6) The operator then fills the bait cup with the appropriate bait and/or attractant etc.

7) The operator inserts the bait cup into the center hole of the base plate.

8) The operator closes the cover of the station and the lid locks automatically to the base.

9) Finally, the operator records their name, service dates and pesticides placed in the station on the label, which can be adhered to the cover.

Another mode of operation involves steps 1–5 above. For step 6, however, the operator may use a pre-filled bait cup rather than filling an empty cup. Steps 7–9 remain the same.

Pests crawl into the station through the entry holes located on the base plate. The guide walls lead them to the bait cup where they retrieve, ingest, touch bait or are trapped. When bait is present pests then travel back to their domicile where they share the bait with other pests.

If children or animals are near the station and are attracted to it, it will be extremely difficult for them to access the bait from the station for the following reasons: 1) the anchor tube is securely anchored into the ground, making it difficult for children or animals to pull it up or even move it around; 2) if the base/cover assembly are twisted in an attempt to remove the unit, it will freely rotate and not transfer the applied torque to the anchor tube, thus preventing the removal of the anchor tube (and bait station) by unscrewing; 3) the cover, which is locked to the base plate, requires a key to open 4) since the bait cup sits beneath the ground, the risk of bait spillage is very low if the station is kicked or otherwise disturbed.

While the invention has been described in terms of various preferred embodiments, the person skilled in the art to which this invention pertains will appreciate that various modifications, substitutions, omissions, and changes may be made without departing from the spirit thereof. Accordingly, it is intended that the scope of the present invention be limited only by the scope of the following claims, including equivalents thereof.

What is claimed is:

1. A device for baiting insects comprising:

a) an anchor tube having a lower open end, an upper open end, a top portion, a bottom portion and means for assisting insertion and securing of said anchor tube into the ground;

b) a base plate having a central opening which cooperates with the upper open end of the anchor tube and a bait cup, removably attached to said anchor tube top portion communicating therewith; and c) a cover hingeably attached to said base plate;
      said bait cup having a top opening, vertical partitions therein, and a hollow central tubular section for receiving a media support rod, said cup placed in said central opening of the base plate and into the top portion in said anchor tube; wherein said base plate includes insect entry holes and internal vertical guide walls to the central opening.

2. The device of claim 1, wherein said base plate has a locking receiving member and said lid has a key insertion member co-operating with said locking receiving member in said base plate.

3. The device of claim 1, wherein the means for assisting insertion of said anchor tube into the ground is a continuous external spiral fin.

4. The device of claim 1, wherein the means for assisting insertion of said anchor tube into the ground is a threaded member acting as a screw mechanism.

5. A device for baiting insects comprising:

a) an anchor tube having a lower open end, an upper open end, a top portion, a bottom portion and means for assisting insertion and securing of said anchor tube into the ground;

b) a base plate having a central opening which cooperates with the upper open end of the anchor tube and a bait cup, removably attached to said anchor tube top portion communicating therewith; and c) a cover hingeably attached to said base plate;
      said bait cup having a top opening, vertical partitions therein, and a hollow central tubular section for receiving a media support rod, said cup placed in said central opening of the base plate and into the top portion in said anchor tube; wherein said base plate sits at ground level and includes insect entry holes and internal vertical guide walls to the central opening and said anchor tube is molded into one integrated piece having a continuous external spiral fin or threaded member.

* * * * *